May 5, 1953 — M. W. ELLISTON — 2,637,418
FISHING REEL
Filed Oct. 2, 1948 — 2 SHEETS—SHEET 1
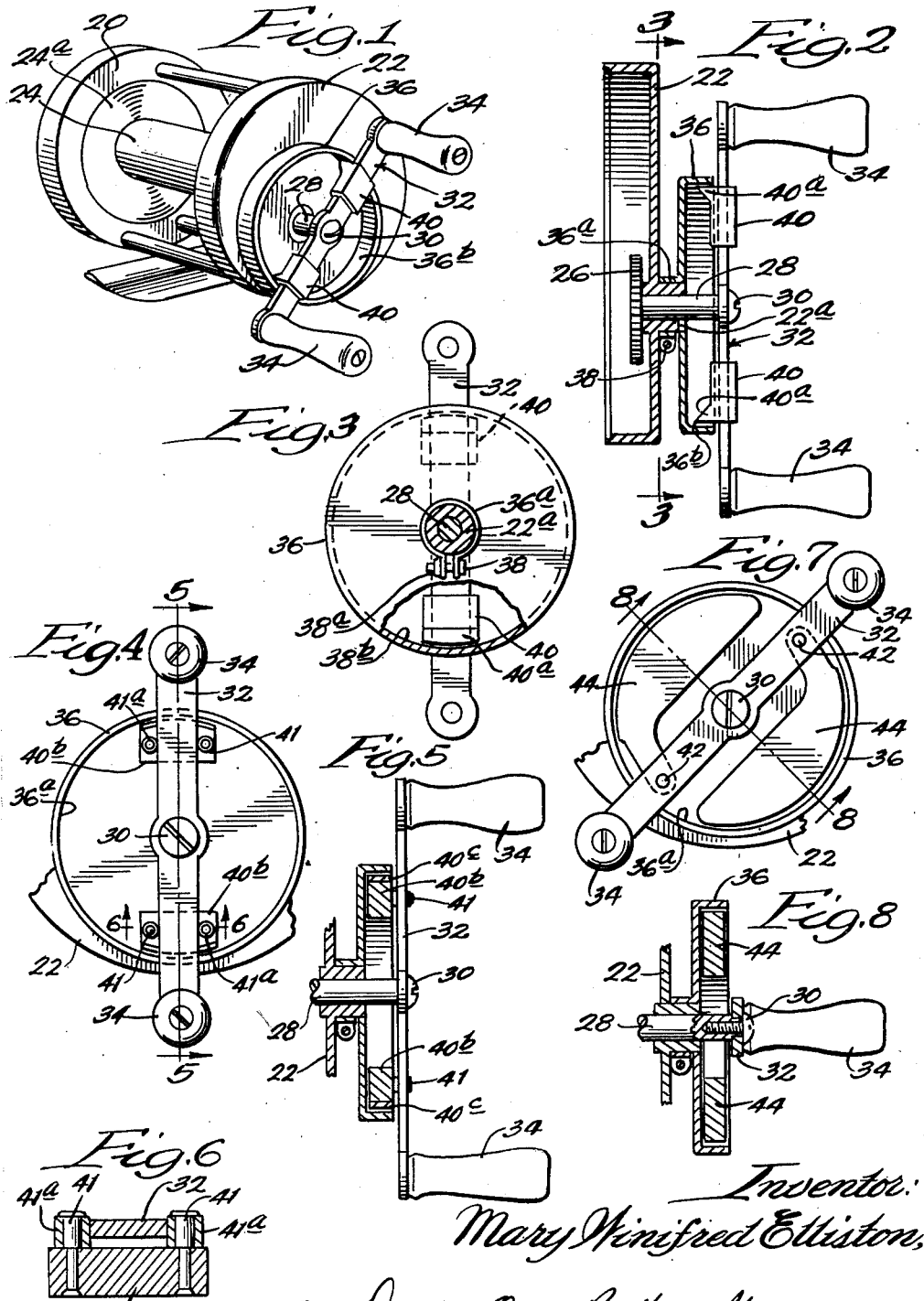
Inventor:
Mary Winifred Elliston,
By Dawson, Ooms, Booth and Spangenberg,
Attorneys.

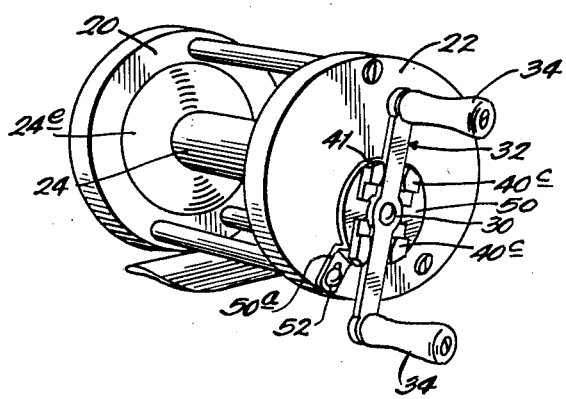
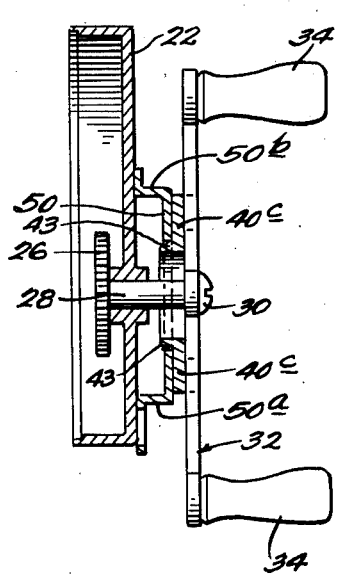
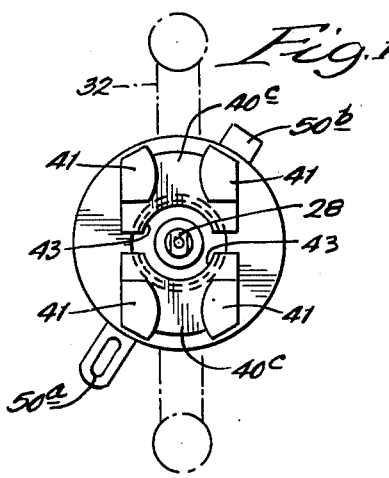

Patented May 5, 1953

2,637,418

UNITED STATES PATENT OFFICE 2,637,418

FISHING REEL

Mary Winifred Elliston, Chicago, Ill., assignor of one-half to Edith K. Weinstein, Highland Park, and one-half to Leroy A. Kling, Evanston, Ill.

Application October 2, 1948, Serial No. 52,458

11 Claims. (Cl. 188—184)

My invention relates to an improved device to brake a fishing reel in accord with the velocity of rotation thereof.

Fishing reels have a tendency to overrun and snarl the line when used for casting purposes. This is the consequence of the inertia of the spindle upon which the line is wound, which inertia causes the spindle to rotate after forward movement of the line is stopped and causes the "speeling" which ultimately results in a snarled, entangled, line.

It has heretofore been proposed to brake rotations of the spindle of a fishing reel in accord with the rotational velocity thereof, and thereby to overcome this tendency to overshoot in a manner having no influence on normal operation, thus enabling the operator to detect even slight tugs on the line while preventing overshoot and snarling. However, special reels have been required for this purpose and it has heretofore been impossible to adopt this mechanism for use on a conventional reel.

In accordance with the present invention, detachable means are provided to brake rotations of a fishing reel. This means may be attached to any fishing reel having a handle and operates without interfering in any respect with the normal use of the reel. Moreover, a variety of replaceable braking surfaces and centrifugal weights may be provided to accommodate the braking to all conditions of operation.

It is therefore a general object of the present invention to provide a detachable brake for a fishing reel.

A more specific object of the present invention is to provide a detachable brake for a fishing reel, which brake may be applied to fishing reels not now having suitable brakes.

Yet another object of the present invention is to provide an improved brake for a fishing reel and containing replaceable elements which may be changed to accommodate the reel to various conditions of operation.

The novel features which I believe to be characteristic of my invention are set forth with particularity in the appended claims. My invention itself, however, both as to its organization and method of operation may best be understood by reference to the following description taken in connection with the accompanying drawing in which:

Figure 1 is an isometric view of a fishing reel equipped with one form of the present invention;

Figure 2 is a fragmentary axial cross-sectional view of the handle portion of the reel of Figure 1;

Figure 3 is a cross-sectional view through axis 3—3, Figure 2;

Figure 4 is a fragmentary side elevational view showing a fishing reel equipped with another embodiment of the present invention;

Figure 5 is a cross-sectional view through axis 5—5, Figure 4;

Figure 6 is a cross-sectional view through axis 6—6, Figure 4;

Figure 7 is a fragmentary side elevational view showing a fishing reel equipped with yet another embodiment of the present invention;

Figure 8 is a cross-sectional view through axis 8—8, Figure 7;

Figure 9 is a view of a fishing reel in perspective with a modified form of the present invention attached;

Figure 10 is a fragmentary axial cross-sectional view through the structure of Figure 9, and;

Figure 11 is a fragmentary end elevational view of the structure of Figure 9.

Referring now to Figure 1, there is shown a fishing reel defined by spaced end plates 20 and 22 and having a spindle 24 located therebetween. As indicated, the spindle 24 comprises a central post portion which receives fish line and has end flanges 24a to retain the line when it is wound thereabout.

The spindle 24 is connected to a gear (not shown) in the end plate 22. This gear meshes with gear 26, Figure 2, which is unitary with shaft 28. The latter terminates in a threaded hole which receives screw 30 to secure handle 32 to the shaft.

The handle 32 comprises a flat metal bar having a suitable central opening to receive screw 30 and a pair of cranks 34 rotatably affixed to its free ends. When it is desired to wind up the fish line, cranks 34 are gripped and handle 32 rotated, thereby rotating spindle 24 and winding up the line.

In accordance with the present invention a cup shaped disk member 36 is affixed to the end plate 22 in concentric relation with shaft 28. Member 36 has a centrally disposed split collar 36a defining a pair of spaced ears between which bolt 38 extends. When this bolt is tightened against nut 38a, the split collar grips exposed hub 22a, Figure 2, of the end plate 22 and thereby sustains the cupped member 36 securely in place.

The cup shaped disk member 36 has a portion 36b defining the braking surface surrounding shaft 38 and facing that shaft and axially aligned therewith.

In the form of the present invention shown in

Figures 1 to 3, a pair of weights 40 are slidably affixed to the handle 32. Each of these weights has a centrally disposed opening to receive the handle and an extending lip 40a adapted to engage the brake surface 36b when the weights travel radially outwardly.

As the handle 32 rotates, the weights 40 travel outwardly under the centrifugal forces developed by rotation. When they engage the braking surface, these weights are each urged thereagainst by these centrifugal forces to create a friction drag opposing rotation of the handle 32 and spindle 24. Since the centrifugal forces increase as the speed of rotation rises, the braking effect varies in accord with speed and at normal low speeds of rotation, the reel is not influenced by the brake. At the high speeds of rotation incident to casting, however, the brake becomes effective and prevents overshoot of the spindle.

In the alternative embodiment of the present invention shown in Figures 4 to 6, the weights 40b do not extend completely about the handle. As shown in these figures, a pair of posts or guides 41 are mounted in spaced positions on the surface of the weights 40b and straddle handle 32 when these weights are in position. If desired, these posts may have rotatable sleeves or rollers as shown at 41a, Figure 6, to facilitate their radial movements.

In the embodiment of Figures 4 to 6, the weights are constrained to rotate with handle 32 by the face of disk 36 and by the posts 41. However, they are free to travel radially outwardly under centrifugal force and thereby engage the inwardly facing braking surface 36a of the disk 36 to achieve braking action.

In the structure of Figures 7 and 8, the handle 32 has a pair of spaced pins 42 to which are affixed the weights 44. These weights are affixed to the pins at points spaced from their centers of mass. As the handle rotates, centrifugal forces urge these weights outwardly to engage the braking surface 36a and thereby oppose rotations of the handle. Preferably, the weights 44 are in the form of arcuate segments for mating engagement with a large area of the surface 36a, thereby minimizing wear.

In the modified structure shown in Figures 9, 10, and 11, a metal annulus or ring 50 is supported in spaced relationship relative to end plate 22 by the support arm 50a which is received by the mounting screw 52. The ring 50 is also held in spaced position relative to end plate 22 by the foot 50b which is in diametrically opposed position relative to arm 50a.

The weights 40c are received between crank 32 and the ring 50. Each of these weights defines a pair of lugs 41 which straddle the crank arm 32 to hold the weights for rotational movements with that arm. Moreover, each weight defines a ring portion 43, Figures 10 and 11, which is of radius to be received in the inner periphery of the ring 50 and which acts as a braking surface to engage that ring as rotation of arm 32 urges weights 40c radially outwardly.

If desired, the weights 40, 40b, and 44, or the braking surface 36a, may be faced with an appropriate braking material to provide the desired coefficient of friction. A facing of this type is shown at 40d, Figure 5. Similarly, the outer surface of the ring portion 43 of weights 40c may be faced with braking material.

Moreover, the mass of the weights 40, 40b, 40c, and 44 may be chosen to achieve the desired degree of braking effect. Increased mass increases the centrifugal force and hence adds to the braking action.

One feature of the present invention resides in the fact that the disk 36 or annulus 50 and the weights 40, 40b, 40c, and 44 may be marketed as separate devices to be affixed to existing fishing reels. It is then possible to achieve the benefits of the persent invention with standard fishing reels having no provision for braking.

Moreover, the apparatus of the persent invention may be changed as required to achieve any desired degree of braking action. If, for example, the braking effect is to be increased heavier weights or weights having a more effective friction surface may be substituted for the former weights. This feature imparts a maximum degree of flexibility to the fishing reel and enables accommodation to a great range of operating conditions.

While I have shown and described specific embodiments of my invention, it will, of course, be understood that I do not wish to be limited thereto and that I intend by the appended claims to cover all such modifications and alternative constructions as fall within the true spirit and scope of my invention.

What I claim as new and desire to secure by Letters Patent of the United States is:

1. A friction braking attachment for a fishing reel of the type having a radially extending handle operable to wind fish line when rotated and supported on a shaft, said attachment comprising a disk defining an inwardly facing braking surface encircling said shaft and a member having parts thereon directly engaging said handle for rotations therewith and radially movable relative to the handle to engage said braking surface, thereby to brake said handle in accord with the angular velocity thereof.

2. A friction braking attachment for a fishing reel of the type having a radially extending handle operable to wind fish line when rotated and supported on a shaft, said attachment comprising a disk defining an inwardly facing braking surface encircling said shaft, and a member affixed to said handle for rotations therewith but radially slidable thereon, said last member being adapted to engage said inner braking surface to oppose rotations of said handle.

3. A device for use with a fishing reel having a handle rotatable to wind fish line and supported on a shaft and means defining an inwardly facing braking surface about said shaft, said device comprising a member slidably affixed to said handle and operable to engage said braking surface, thereby to brake said handle in accord with the angular velocity thereof.

4. A device for attachment to a fishing reel having a handle rotatable to wind fish line and an exposed hub encircling said handle, said device comprising a disk having a split collar adapted to grip said hub and defining an inwardly facing braking surface about said hub, and a member affixed to said handle for rotations therewith and radially movable thereon to engage said braking surface, thereby to brake said handle in accord with the angular velocity thereof.

5. A braking device for use with a rotatable handle having a cup shaped member defining an inwardly facing braking surface axially aligned with said handle, said device comprising a weight adapted to fit between the bottom of said cup and said handle and having a pair of guides adapted to straddle said handle, whereby said member is constrained to rotate with said handle but is free to press against said surface.

6. A braking device for use with a rotatable handle having a cup shaped member defining an inwardly facing braking surface axially aligned with said handle, said device comprising a weight adapted to fit between the bottom of said cup and said handle and having a pair of rollers adapted to straddle said handle, whereby said member is constrained to rotate with said handle but is free to press against said surface.

7. The combination in a fishing reel of a frame, a handle operable to wind fish line when rotated relative to said frame, a cup shaped member affixed to said frame and defining an inwardly facing braking surface axially aligned with said handle, and a weight adapted to be received in said cup and having a pair of guides straddling said handle, whereby said weight is constrained to rotate with said handle but is free to press against said surface.

8. A braking device for use with a rotatable handle having means defining an inwardly facing braking surface surrounding said handle, said device comprising a weight adapted to fit between said handle and said means and defining a pair of lugs straddling said handle on one side and a braking surface on the other side adapted to engage said first braking surface.

9. A braking mechanism for a fishing reel of the type having a rotatable handle and an end plate, said mechanism comprising an annular plate adapted to be affixed to said end plate in spaced relation therewith and surrounding said handle, and a weight adapted to be received between said handle and said annular plate, said weight having a pair of lugs straddling said handle to hold said weight for rotation therewith and a braking surface adapted to engage the inner periphery of said annular plate.

10. A braking mechanism for use with a fishing reel of the type having a radially extending handle rotatable to wind fish line and supported on a shaft and means defining an annular braking surface coaxial with and adjacent to the shaft, said mechanism comprising a weight member, means connecting the weight member to the handle for rotation therewith and for radial sliding movement relative thereto, and means at the inner end of the weight member, defining a friction surface to engage said annular braking surface when the weight member moves out in response to centrifugal force thereby to brake said handle in accordance with the angular velocity thereof.

11. A braking mechanism for use with a fishing reel of the type having a radially extending handle rotatable to wind fish line and supported on a shaft and means defining an annular braking surface coaxial with and adjacent to the shaft, said mechanism comprising, a pair of weight members lying on diametrically opposite sides of the shaft, means connecting the weight members to the handle for rotation therewith and for radial sliding movement relative thereto, and means at the inner ends of the weight members defining friction surfaces to engage diametrically opposite portions of the annular braking surface when the weights move out in response to centrifugal force, the weights and connecting means being balanced about the axis of the shaft.

MARY WINIFRED ELLISTON.

References Cited in the file of this patent

UNITED STATES PATENTS

| Number | Name | Date |
| --- | --- | --- |
| 948,026 | Scotchmer | Feb. 1, 1910 |
| 1,566,594 | Graham | Dec. 22, 1925 |
| 2,020,739 | Porter | Nov. 12, 1935 |
| 2,181,359 | Barrett | Nov. 28, 1939 |
| 2,489,447 | Borgstrum | Nov. 29, 1947 |

FOREIGN PATENTS

| Number | Country | Date |
| --- | --- | --- |
| 5,531 | Great Britain | Mar. 4, 1914 |